United States Patent

Li et al.

Patent Number: 5,288,827
Date of Patent: Feb. 22, 1994

[54] COPOLYMER OF (METH)ACRYLOXY-ALKYL-SILOXYSILANE AND ALKYL(METH)ACRYLATES AND THE USE THEREOF AS PRESSURE SENSITIVE ADHESIVES

[75] Inventors: Xiaoling Li, Dobbs Ferry; Bret Berner, Scarsdale, both of N.Y.

[73] Assignee: Ciba-Geigy Corporation, Ardsley, N.Y.

[21] Appl. No.: 18,667

[22] Filed: Feb. 17, 1993

[51] Int. Cl.[5] .......................................... C08F 230/08
[52] U.S. Cl. ........................... 526/279; 526/264; 526/931; 526/245; 522/172
[58] Field of Search ............... 526/279, 931, 264, 245; 522/172

[56] References Cited

U.S. PATENT DOCUMENTS 2,884,126  4/1959  Ulrich .................................. 428/355
2,973,286  2/1961  Ulrich .................................. 428/355

(List continued on next page.)

OTHER PUBLICATIONS

Derwent Abstract 88-201278/29, corresponding to Japan 63,137,934.
Derwent Abstract 89-335983/46, corresponding to Japan 01,249,872.

*Primary Examiner*—Joseph L. Schofer
*Assistant Examiner*—Mark Nagumo
*Attorney, Agent, or Firm*—Irving M. Fishman; Karen G. Kaiser

[57] ABSTRACT

A new polymer, the feed monomers and molar percents of which, exclusive of a polymerization initiator and crosslinker, are:

A.
  (I) 42 mole % to 58 mole % of a siloxy silane of formula I,
  (II) 42 mole % to 58 mole % of an unsubstituted alkyl (meth)acrylate of formula II,
  (III) 0 to 5 mole % of a Group A monomer, and
  (IV) 0 to 16 mole % of an additional vinylic copolymerizable monomer;

B.
  (I) 42 mole % to 58 mole % of a siloxy silane of formula I,
  (II) 21 mole % up to less than 42 mole % of an unsubstituted alkyl (meth)acrylate of formula II,
  (III) 0 to 5 mole % of a Group A monomer, and
  (IV) 0 to 29 mole % of an additional vinylic copolymerizable monomer, or C.
  (I) 16 mole % up to less than 42 mole % of a siloxy silane of formula I,
  (II) 42 mole % of 58 mole % of an unsubstituted alkyl (meth)acrylate of formula II,
  (III) 0 to 5 mole % of a Group A monomer, and
  (IV) 0 to 36 mole % of an additional vinylic copolymerizable monomer, where formula I is

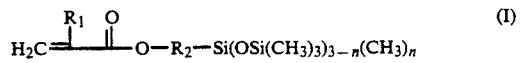

where formula II is

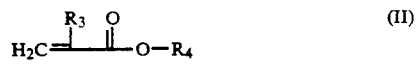

where Group A is a vinylic acid or a (meth)acrylate as defined herein. Methods of manufacture of the polymer and the use thereof as a pressure adhesive, especially a transdermal and/or transmucosal delivery system pressure sensitive adhesive, are also claimed.

9 Claims, No Drawings

U.S. PATENT DOCUMENTS

| | | | |
|---|---|---|---|
| 3,121,021 | 2/1964 | Copeland | 428/219 |
| 3,321,451 | 5/1967 | Gander | 526/287 |
| 3,475,363 | 10/1969 | Gander | 523/111 |
| 3,532,652 | 10/1970 | Zang et al. | 428/355 |
| 3,998,997 | 12/1976 | Mowdood et al. | 526/271 |
| 4,140,115 | 2/1979 | Schonfeld | 128/156 |
| 4,156,035 | 5/1979 | Tsao et al. | 427/44 |
| 4,374,883 | 2/1983 | Winslow | 428/40 |
| 4,432,848 | 2/1984 | Korpman | 204/159.17 |
| 4,665,145 | 5/1987 | Yokota et al. | 526/279 |
| 4,693,776 | 9/1987 | Krampe et al. | 156/327 |
| 4,714,655 | 12/1987 | Bordoloi et al. | 428/395 |
| 4,732,808 | 3/1988 | Krampe et al. | 156/327 |
| 4,737,559 | 4/1988 | Kellen et al. | 526/291 |
| 4,786,552 | 11/1988 | Sasaki et al. | 428/355 |
| 4,810,766 | 3/1989 | Ohmori et al. | 526/279 |
| 4,847,137 | 7/1989 | Kellen et al. | 428/195 |
| 4,861,840 | 8/1989 | Lim et al. | 525/326.5 |
| 5,010,141 | 4/1991 | Mueller | 525/270 |
| 5,115,056 | 5/1992 | Mueller et al. | 576/243 |
| 5,191,045 | 3/1993 | Funaki et al. | 526/259 |

COPOLYMER OF (METH)ACRYLOXY-ALKYL-SILOXYSILANE AND ALKYL(METH)ACRYLATES AND THE USE THEREOF AS PRESSURE SENSITIVE ADHESIVES

FIELD OF THE INVENTION

The present invention relates to novel copolymers of certain siloxy silanes and alkyl (meth)acrylates. It further relates to pressure sensitive adhesives, especially medical adhesives. In addition, the invention further relates to transdermal and transmucosal drug delivery products and the pressure sensitive medical adhesives used therein.

BACKGROUND OF THE INVENTION

Pressure sensitive adhesives (PSA) have been widely used in various fields for holding, protecting, sealing, and masking purposes. Application of PSA to the medical area is an important application field and the subject of considerable investigation. One recent application to the medical field is to the area of transdermal (and less so, transmucosal) drug delivery systems. In the rest of this specification, unless the context requires otherwise, the term "transdermal" will refer collectively to transdermal and transmucosal and the term "skin" will refer respectively to skin or mucosa depending on whether a transdermal or transmucosal device is under consideration. In addition to the general requirements for PSAs for general use, transdermal delivery systems require that PSAs be nonirritating to the skin, be physically and chemically compatible with the drug(s) being delivered therethrough, and be moisture resistant. PSAs must also adhere well to the skin, provide intimate contact of the transdermal system with the skin surface during application of the transdermal system, and leave no residue upon removal.

Transdermal drug delivery systems can be divided into two types: (a) reservoir systems and (b) matrix or monolithic systems. PSAs are key components in both types of systems. Therefore, a PSA that meets the aforementioned requirements and at the same time is easily formulated and processed for manufacture of transdermal drug delivery systems would play a critical role in the design, development, and production of such systems and has been long sought after.

Since the permeation of drugs through the skin is limited by the molecular weight, partition coefficient, and solubility of the drug being administered as well as the skin structure itself, transdermal drug delivery systems have frequently been limited to certain drugs that possess the favored physics-chemical properties for skin permeation. As such, permeation enhancers have been used to raise the flux of various drugs through the skin and enable transdermal drug delivery systems to achieve therapeutic blood levels of a much wider range of drugs. These enhancers extend the availability of the transdermal route to a wide range of bioactive agents including hydrophilic drugs, peptides, etc. Unfortunately, the introduction of the enhancer often simultaneously introduced problems relating to the adhesives used in the system. These have included: failure of the integrity of the system, loss of tack of PSA, and loss of cohesive strength.

The major PSAs that have been evaluated and used in transdermal systems are polyisobutylene, polyacrylates, and polydimethylsiloxanes. Acrylic type PSAs have served as adhesives in transdermal commercial products. Alkyl acrylates are tacky and pressure-sensitive, and therefore do not require the addition of tackifying agents or plasticizers. This type of PSA is also non-oxidizing, and, therefore, does not need any anti-oxidant. Organic silicones have been considered biocompatible and oxygen permeable. From the above, it is apparent that a PSA composed of acrylic and organic silicone types of polymers and retaining the best properties of each would be highly desirable for use in medical, specifically transdermal drug delivery system, applications.

U.S. Pat. Nos. 2,884,126 (Ulrich, 1959), 2,973,286 (Ulrich, 1961), 3,121,021 (Copeland, 1964) 3,321,451 (Gander, 1967), 3,475,363 (Gander, 1969), 3,998,997 (Mowdood et al, 1976), and 4,374,883 (Winslow, 1983) describe copolymers of acrylates and acrylic acid as PSAS. U.S. Pat. Nos. 4,432,848 (Korpman, 1984) describes a PSA based on A-B-A copolymer of alkenylarene and isoprene. U.S. Pat. Nos. 4,693,776 (Krampe et al, 1987) and 4,732,808 (Krampe et al, 1988) describe copolymers of acrylic acid, alkyl acrylate, and methacrylate terminated macromers and their use for skin adhesion. In U.S. Pat. Nos. 3,532,652 (Zang, 1970), copolymers of alkyl acrylate and vinyl or acrylic monomers with functional groups, such as carboxyl, hydroxyl, amino, as well as amido and substituted amido, crosslinked with isocyanate terminated polymers were claimed as PSAS. U.S. Pat. Nos. 4,737,559 (Kellen et al, 1988) and 4,847,137 (Kellen et al, 1989) describe UV-polymerization of acrylates with mono-ethylenically unsaturated aromatic ketone monomer as a photocrosslinker in PSAS. US U.S. Pat No. 4,714,655 (Bordolol et al, 1987) describes UV-polymerization for PSAs containing heat sensitive materials from commercially available prepolymers. Transdermal application is specifically referred to. U.S. Pat. Nos. 4,156,035 (Tsao et al, 1979) and 4,786,552 (Sasaki et al., 1988) discuss UV-curable compositions and processes. These and other UV-curing processes offer significant advantages over other (non-UV) curing methods, in particular, freedom from use of organic solvents in preparation and the concomitant environmental disposal problems associated therewith, reduction in energy utilization to carry out the polymerization, and the freedom to incorporate heat sensitive materials into the composition.

In U.S. Pat. Nos. 4,140,115 (Schonfeld, 1979) an organic silicone monomer, 3-methacryloxypropyltrimethoxysilane, was used as a cross-linking agent in very small amounts (0.01–0.05 parts of total monomers by weight). Terpolymers or tetrapolymers of acrylate/methacrylate and 3-methacryloxypropyl tris(trimethylsiloxy) silane have been disclosed in U.S. Pat. No. 4,665,145 (Yokota et al, 1987), Japanese Patent 01249872 (Tamada et al, 1989) and Japanese Patent 63137934 (Okido et al, 1988).

It has been known that a PSA should have a balance of cohesive and adhesive strength to perform appropriately in a transdermal drug delivery system. Such a balance has been attempted by incorporating two or more components with different properties by blending polymers or in some instances by copolymerization. The hoped for result is that the desired balance is achieved (the beneficial properties of the components are retained) while the disadvantages of the components are overcome.

Poly(alkyl acrylate)s, especially poly(ediylhexyl acrylate), are generally known as tacky, low glass transition temperature polymers. By incorporating a component with a higher glass transition temperature and higher cohesive strength, one would hope for a copolymer which would exhibit more favorable properties suitable for exploitation in a transdermal drug delivery system.

U.S. Pat. Nos. 5,010,141 (Mueller, 1991) and 5,115,056 (Mueller et al, 1992) discloses the use of siloxy silanes as comonomers in the preparation of contact lenses, a utility which would lead away from the notion that the compositions containing the siloxy silanes in any significant proportion would have adhesive properties.

All of the foregoing US Patents are hereby incorporated by reference into this specification, the same as if the details thereof had been repeated here verbatim.

OBJECTS OF THE INVENTION

It is an object of the invention to provide a new pressure sensitive adhesive.

It is another object of the invention to provide a pressure sensitive adhesive for use in medical practice, especially in transdermal and transmucosal drug delivery systems.

Yet a further object of the invention is to provide a transdermal and/or transmucosal pressure sensitive medical adhesive which overcomes the disadvantages of the art set forth above.

SUMMARY OF THE INVENTION

Surprisingly, these and other objects of the invention are realized with a copolymer of a siloxy silane monomer of formula I with an alkyl (meth)acrylate monomer of formula II and optionally other vinylic copolymerizable monomers. The siloxy silane monomer of formula I is

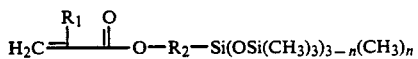
(I)

wherein $R_1$ is hydrogen or methyl; $R_2$ is $C_{1-6}$alkylene, and n is an integer from 0 to 2; or mixtures thereof. The alkyl (meth)acrylate monomer of formula II

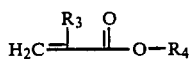
(II)

wherein $R_3$ is hydrogen or methyl; and $R_4$ is unsubstituted methyl or is unsubstituted linear or branched alkyl of 2-10 carbon; or mixtures thereof. Either of these two components must comprise 42-58 mole % of the total monomer feed (exclusive of any polymerization initiator and crosslinker which may be present). The remainder, if any, is made up of at least one copolymerizable vinylic monomer. In addition, the monomer feed contains a suitable amount of a polymerization initiator, and, where desirable a crosslinking agent. The most preferred embodiment is when $R_1$ is methyl, $R_2$ is propylene, n is zero, $R_3$ is hydrogen, and $R_4$ is 2-ethylhexyl and the only monomers in the feed are those of formula I and formula II.

DETAILED DESCRIPTION OF THE INVENTION

As stated above, the present invention is a copolymer of at least two monomers, a siloxy silane of formula I and an alkyl (meth)acrylate of formula II both set forth below. Neglecting the polymerization initiator and any crosslinking agent that may be present, either or both of these monomers are fed into the polymerization reaction in amounts of 42 mole % to 58 mole %. The remainder to make up 100 mole % of the monomer feed may be another copolymerizable vinylic monomer. In the case where one of the two primary monomers (of formula I and formula II), but not both, is below 42 mole % of the monomer feed, the balance can be made up from the copolymerizable vinylic monomer. For purposes of this disclosure, unless specifically stated otherwise or the context requires otherwise, monomer feed mole %s will neglect any initiator and crosslinking agent which may be present.

The siloxy silane of formula I is

(I)

in which $R_1$ is hydrogen or methyl, preferably methyl; $R_2$ is branched or linear chain, preferably linear chain, alkylene of 1 to 6 carbon atoms, preferably 2-5 carbon atoms, more preferably 3 or 4 carbon atoms, still more preferably 3 carbon atoms, and most preferably n-propylene; and n is an integer 0, 1, or 2, most preferably zero. The most preferred compound of formula I is 3-methacryloxypropyl tris(trimethylsiloxy)silane.

Other compounds of formula I which are particularly suitable for use in the instant invention include, but are not limited to:
(2-acryloxyethyl)-dimethyl-(trimethylsiloxy)-silane,
(2-acryloxyethyl)-monomethyl-bis(trimethylsiloxy)-silane,
(2-acryloxyethyl)-tris(trimethylsiloxy)-silane,
(2-methacryloxyethyl)-dimethyl-(trimethylsiloxy)-silane,
(2-methacryloxyethyl)-monomethyl-bis(trimethylsiloxy)-silane,
(2-methacryloxyethyl)-tris(trimethylsiloxy)-silane,
(2-acryloxy-1-methylethyl)-dimethyl-(ethylsiloxy)-silane,
(2-acryloxy-1-methylethyl)-monomethyl-bis(trimethylsiloxy)-silane,
(2-acryloxy-1-methylethyl)-tris(trimethylsiloxy)-silane,
(2-methacryloxy-1-methylethyl)-dimethyl-(trimethylsiloxy)-silane,
(2-methacryloxy-1-methylethyl)-monomethyl-bis(trimethylsiloxy)-silane,
(2-methacryloxy-1-methylethyl)-tris(trimethylsiloxy)-silane,
(2-acryloxypropyl)-dimethyl-(trimethylsiloxy)-silane,
(2-acryloxypropyl)-monomethyl-bis(trimethylsiloxy)-silane,
(2-acryloxypropyl)-tris(trimethylsiloxy)-silane,
(2-methacryloxypropyl)-dimethyl-(trimethylsiloxy)-silane,
(2-methacryloxypropyl)-monomethyl-bis(trimethylsiloxy)-silane,
(2-methacryloxypropyl)-tris(trimethylsiloxy)-silane,
(3-acryloxypropyl)-dimethyl-(trimethylsiloxy)-silane,
(3-acryloxypropyl)-monomethyl-bis(trimethylsiloxy)-silane,
(3-acryloxypropyl)-tris(trimethylsiloxy)-silane,
(3-methacryloxypropyl)-dimethyl-(trimethylsiloxy)-silane,
(3-methacryloxypropyl)-monomethyl-bis(trimethylsiloxy)-silane, (3-methacryloxypropyl)-tris(trimethylsiloxy)-silane,
(2-acryloxybutyl)-dimethyl-(trimethylsiloxy)-silane,
(2-acryloxybutyl)-monomethyl-bis(trimethylsiloxy)-silane,
(2-acryloxybutyl)-tris(trimethylsiloxy)-silane,
(2-mediacryloxybutyl)-dimethyl-(trimethylsiloxy)-silane,
(2-methacryloxybutyl)-monomethyl-bis(trimethylsiloxy)-silane,
(2-methacryloxybutyl)-tris(trimethylsiloxy)-silane,
(3-acryloxybutyl)-dimethyl-(trimethylsiloxy)-silane,
(3-acryloxybutyl)-monomethyl-bis(trimethylsiloxy)-silane,
(3-acryloxybutyl)-tris(trimethylsiloxy)-silane,
(3-methacryloxybutyl)-dimethyl-(trimethylsiloxy)-silane,
(3-methacryloxybutyl)-monomethyl-bis(trimethylsiloxy)-silane,
(3-methacryloxybutyl)-tris(trimethylsiloxy)-silane,
(4-acryloxybutyl)-dimethyl-(trimethylsiloxy)-silane,
(4-acryloxybutyl)-monomethyl-bis(trimethylsiloxy)-silane,
(4-acryloxybutyl)-tris(trimethylsiloxy)-silane,
(4-methacryloxybutyl)-dimethyl-(trimethylsiloxy)-silane,
(4-methacryloxybutyl)-monomethyl-bis(trimethylsiloxy)-silane,
(4-methacryloxybutyl)-tris(trimethylsiloxy)-silane,
(2-acryloxy-2-methylpropyl)-dimethyl-(trimethylsiloxy)-silane,
(2-acryloxy-2-methylpropyl)-monomethyl-bis(trimethylsiloxy)-silane,
(2-acryloxy-2-methylpropyl)-tris(trimethylsiloxy)-silane,
(2-methacryloxy-2-methylpropyl)-dimethyl-(trimethylsiloxy)-silane,
(2-methacryloxy-2-methylpropyl)-monomethyl-bis(-trimethylsiloxy)-silane,
(2-methacryloxy-2-methylpropyl)-tris(trimethylsiloxy)-silane,
(2-acryloxy- 1,2-dimethylethyl)-dimethyl-(trimethylsiloxy)-silane,
(2-acryloxy- 1,2-dimethylethyl)-monomethyl-bis(trimethylsiloxy)-silane,
(2-acryloxy- 1,2-dimethylethyl)-tris(methylsiloxy)-silane,
(2-methacryloxy- 1,2-dimethylethyl)-methyl-(trimethylsiloxy)-silane,
(2-methacryloxy- 1,2-dimethylethyl)-monomethyl-bis(-trimethylsiloxy)-silane,
(2-methacryloxy- 1,2-dimethylethyl)-tris(trimethylsiloxy)-silane,
(2-acryloxy- 1, 1 -dimethylethyl)-dimethyl-(trimethylsiloxy)-silane,
(2-acryloxy- 1, 1 -dimethylethyl)-monomethyl-bis(-trimethylsiloxy)-silane,
(2-acryloxy- 1,1-dimethylethyl)-tris(trimethylsiloxy)-silane,
(2-methacryloxy- 1,1-dimethylethyl)-dimethyl-(trimethylsiloxy)-silane,
(2-methacryloxy- 1, 1 -dimethylethyl)-monomethyl-bis(trimethylsidoxy)-silane,
(2-methacryloxy- 1, 1 -dimethylethyl)-tris(trimethylsiloxy)-silane,
(2-acryloxy-2,2-dimethylethyl)-dimethyl-(trimethylsiloxy)-silane,
(2-acryloxy-2,2-dimethylethyl)-monomethyl-bis(trimethylsiloxy)-silane,
(2-acryloxy-2,2-dimethylethyl)-tris(trimethylsiloxy)-silane,
(2-methacryloxy-2,2-dimethylethyl)-dimethyl-(trimethylsiloxy)-silane,
(2-methacryloxy-2,2-dimethylethyl)-monomethyl-bis(-trimethylsiloxy)-silane,
(2-methacryloxy-2,2-dimethylethyl)-tris(trimethylsiloxy)-silane,
(3-acryloxy- 1-methylpropyl)-dimethyl-(trimethylsiloxy)-silane,
(3-acryloxy- 1-methylpropyl)-monomethyl-bis(trimethylsiloxy)-silane,
(3-acryloxy-1-methylpropyl)-tris(trimethylsiloxy)-silane,
(3-methacryloxy- 1 -methylpropyl)-dimethyl-(trimethylsiloxy)-silane,
(3-methacryloxy- 1-methylpropyl)-monomethyl-bis(-trimethylsiloxy)-silane,
(3-methacryloxy- 1-methylpropyl)-tris(trimethylsiloxy)-silane,
3-acryloxy-2-methylpropyl)-dimethyl-(trimethylsiloxy)-silane,
(3-acryloxy-2-methylpropyl)-monomethyl-bis(trimethylsiloxy)-silane,
(3-acryloxy-2-methylpropyl)-tris(trimethylsiloxy)-silane,
(3-methacryloxy-2-methylpropyl)-dimethyl-(trimethylsiloxy)-silane,
(3-methacryloxy-2-methylpropyl)-monomethyl-bis(-trimethylsiloxy)-silane, and
(3-methacryloxy-2-methylpropyl)-tris(trimethylsiloxy)-silane.

The alkyl (meth)acrylate of formula II is

where $R_3$ is hydrogen or methyl, preferably hydrogen; and $R_4$ is branched or linear chain, preferably branched, unsubstituted alkyl of 1-10 carbon atoms, preferably 4-10 carbon atoms, more preferably 6-10 carbon atoms, even more preferably 8 carbon atoms, and most preferably 2-ethylhexyl. The most preferred compound of formula III is 2-ethylhexyl acrylate.

Compounds of formula II particularly suitable for the instant invention include, but are not limited to:

acrylate and methacrylate esters of the following unsubstituted alcohols: methanol, ethanol, propanol, isopropanol, n-butanol, 2-butanol, 2-methylpropanol, tertiary butanol, n-pentanol, 1-methylbutanol, 2-methylbutanol, 3-methylbutanol, 1,1 -dimethylpropanol, 1,2-dimethylpropanol, 2,2-dimethylpropanol, 1 -ethylpropanol, n-hexanol, 1-ethylbutanol, 2-ethylbutanol, n-heptanol, 1-ethylpentanol, 2-ethylpentanol, 3-ethylpentanol, n-octanol, 1-ethylhexanol, 2-ethylhexanol, 3-ethylhexanol, 4-ethylhexanol, 2-ethyl-l-methylpentanol, 2-isopropylpentanol, 1,2-diethylbutanol, n-nonol, 1-ethylheptanol, 2-ethylheptanol, 2-ethyl-l-methylhexanol, 2-ethyl-2-methylhexanol, 2-isopropylhexanol, n-decanol, 2-ethyloctanol, and 2,2-diethylhexanol.

The optional vinylic copolymerizable monomer is a monomer which can be polymerized together with the monomers of formulas I and II, but are not within formulas I or II. These monomers fall into two typical groups. Group A includes compounds which are substituted alkyl acrylates of formula III

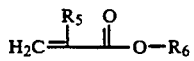

(III)

in which $R_5$ is hydrogen or methyl and $R_6$ is branched or linear substituted alkyl of 1–10 carbon atoms, preferably 4–10 carbon atoms, more preferably 6–10 carbon atoms, and most preferably 8 carbon atoms. In short, the componuds of formla III are selected from the same group as those of formula II except that those of formula III are substituted while those of formula II are unsubstituted. These substituents may be one or more and need not be the same, although when multiple substituents are present, they are preferably the same. The substituents are selected from hydroxy, $C_{1-4}$alkoxy, Cl, Br, F, carboxy, $C_{1-4}$alkoxycarbonyl, $C_{1-4}$alkylcarbonyloxy, amino, preferably hydroxy. Typical examples include, but are not limited to:

mono-acrylate and mono-methacrylate esters of the following alcohols, which alcohols are further substituted as set forth below:

methanol, ethanol, propanol, isopropanol, n-butanol, 2-butanol, 2-methylpropanol, tertiary butanol, n-pentanol, 1-methylbutanol, 2-methylbutanol, 3-methylbutanol, 1,1-dimethylpropanol, 1,2-dimethylpropanol, 2,2-dimethylpropanol, 1-ethylpropanol, n-hexanol, l-ethylbutanol, 2-ethylbutanol, n-heptanol, 1-ethylpentanol, 2-ethylpentanol, 3-ethylpentanol, n-octanol, 1-ethylhexanol, 2-ethylhexanol, 3-ethylhexanol, 4-ethylhexanol, 2-ethyl-l-methylpentanol, 2-isopropylpentanol, 1,2-diethylbutanol, n-nonol, 1-ethylheptanol, 2-ethylheptanol, 2-ethyl-l-methylhexanol, 2-ethyl-2-methylhexanol, 2-isopropylhexanol, n-decanol, 2-ethyloctanol, and 2,2-diethylhexanol. These alcohols, which are further substituted, include those substituted by hydroxy, such as ethylene glycol, propylene glycol, glycerol, butylene glycol, 1,2,3-butanetriol, 1,4,6-hexanetriol, 2-hydroxyethylhexanol, 4-hydroxy-2-ethylhexanol, 4-hydroxymethyl-2-ethylpentanol, and 4-hydroxy-2-hydroxyethylhexanol; $C_{1-4}$alkoxy (i.e. methoxy, ethoxy, propoxy, isopropoxy, and butoxy, for example), such as 3-methoxy-2-ethylhexanol, 4-ethoxy-2-ethyl- 1 -methylpentanol, etc; a halogen selected from Cl, F, and Br, such as 2-chloro-octanol, 2-(2-fluoroethyl)hexanol, etc; carboxy, such as (1-carboxy or 2-carboxy)-2-ethylhexanol, etc; amino, such as 1-amino-2-ethylhexanol; as well as those having more than one substituent which are not same as one another, for example 1-amino-l-carboxy-2-ethylhexanol. Group A monomers further include vinylic acids such as (meth)acrylic acid, maleic acid, fumaric acid, itaconic acid, cinnamic acid, crotonic acid, 2-(methy)acroyloxyethyl sulfonic acid, 2-(meth)acrylamido-2-methylpropane sulfonic acid, vinyl sulfonic acid, p-styrene sulfonic acid, and allyl sulfonic acid. When present, these optional monomers do not exceed 5 mole % preferably do not exceed 2.5 mole %, more preferably do not exceed 1 mole % of the total monomer feed.

The other group of the optional vinylic copolymerizable monomers, Group B, are non-(meth)acrylic vinylic monomers or they are (meth)acrylate amides, sulfonates or phosphonates. Examples include, without limitation:

mono and dimethyl fumarate, diethyl fumarate, mono and diisopropyl fumarate, mono and di methyl maleate, momo and diisopropyl itaconate, mono and diphenyl fumarate, methyl-phenyl-fumarate, bis hydroxyethylfumarate, methyl-phenyl-fumarate, bis hydroxyethylmaleate, bis hydroxyethylfumarate, allyl alcohol, beta-allylethanol, vinylethylcarbinol, 2-hydroxyethylvinyl ether, vinyl acetate, vinyl alcohol, methyl-vinyl ether, vinyl propionate, vinyl benzoate, N-(1,1-dimethyl-3-oxobutyl)acrylamide, 2-hydroxyethyl(meth)acrylamide, 2-hydroxypropyl(meth)acrylamide, 3-hydroxypropyl(meth)acrylamide, 2,3-dihydroxypropyl(meth)acrylamide, poly(ethyloxy)-ethyl(meth)acrylwnide, poly(ethyloxy)-propyl(meth)acrylamide, sucrose(meth)acrylate, mannose(meth)acrylate, glucose(meth)acrylate, sorbitol(meth)acrylate, (meth)acrylamide, N-methyl and N,N-dimethyl(meth)acrylamide, N-2-hydroxyethyl(meth)acrylamide, N-3-hydroxypropyl(meth)acrylamide, bis acetone(meth)acrylamide, methylol(meth)acrylamide, vinylformamide, vinyl acetamide, diacetophenone, allyloxyethane, N-vinyl pyrrolidone, N-vinyl acetainide, acrylonitrile, styrene, alpha-methylstyrene, t-butylstyrene, $C_{1-4}$alkoxy-$C_{1-4}$ alkyl (meth)acrylate and (meth)acrylamide, and the (meth)acrylates and (meth)acrylamides of the following groups: benzyl, t-butylphenyl, cyclohexyl, trimethylcyclohexyl, isobornyl, dicyclopentadienyl, norbornyl-methyl, glycidyl, $C_{1-4}$alkylthio-$C_{1-4}$alkyl, furfuryl, 2-(2-ethoxyethoxy)ethyl, hexafluoroisopropyl, 1,1,2,2-tetrahydroperfluorododecyl, N,N-diethyl-aminoethyl, and N-t-butyl-aminoethyl. Still other monomers within this group include 2-vinyl pyridine, 4-vinyl pyridine, 2- or 4-methyl-5-vinyl pyridine, N-methyl-4-vinyl pyridine, l-vinyl imidazole, 2-methyl-1-vinyl imidazole, p-aminostyrene, o-aminostyrene, (dimethylaminoethyl)vinyl ether, vinyl pyrrolidine, 2-hydroxyethyl fumarate, di-(2-hydroxyethyl) fumatate, 2-hydroxyethyl maleate, di-(2-hydroxyethyl) maleate, 2-hydroxyethyl itaconate, di-(2-hydroxyethyl) itaconate, (3-hydroxypropyl)-(butyl)-fumarate, di-(hydroxy-poly lower alkyleneoxide) fumarate, di-(hydroxy-poly lower alkyleneoxide) maleate, di-(hydroxy-poly lower alkyleneoxide) itaconate, 2-phosphatoethyl (meth)acrylate, and others as set forth in the patents mentioned above and incorporated herein by reference. When these monomers are used in the embodiment in which the unsubstituted alkyl(meth)acrylate of formula II makes up less than 42 mole % of the monomer feed, they can be present in an amount not to exceed about 29 mole % of the total monomer feed, preferably about 25 mole %, more preferably not more than 15 mole %, more preferably not more than 10 mole %, even more preferably not more than 5 mole % of the total monomer feed. In the embodiment where the siloxy silane of formula I is present less than 42 mole %, these monomers can be present in amounts not more than about 36 mole % of the total monomer feed, preferably mot more than 31 mole %, more preferably not more than 15 mole %, more preferably not more than 10 mole %, even more preferably not more than 5 mole % of the total monomer feed. In situations where these additional optional monomers and the substituted alkyl(meth)acrylates of formula III are present simultaneously, the amounts set forth in this paragraph are inclusive of the amounts of the substituted alkyl(meth)acrylate monomers of formula III.

In embodiments in which both the compounds of formula I and formula II are present in amounts of or greater than 42 mole % of the monomer feed, the balance can be made up of no more than 5 mole %, preferably 2.5 mole %, more preferably 1 mole % of the monomers of Group A mentioned above, with any remainder being selected from the additional optional monomers of Group B set forth above.

Preferred embodiments of the present invention include:
polymers having a polymerization feed mixture of
(a) an effective amount of a polymerization initiator,
(b) 0 to 5 mole %, based on the total of all monomers present, of a vinylic copolymerizable crosslinker, and
(c) one of the following groups (i), (ii), or (iii);
where (i) is
(I) 42 mole % to 58 mole % of a siloxy silane of formula I,
(II) 42 mole % to 58 mole % of an unsubstituted alkyl (meth)acrylate of formula II,
(III) 0 to 5 mole % of a Group A monomer, and
(IV) 0 to 16 mole % of an additional vinylic copolymerizable monomer of Group B;
where (ii) is
(I) 42 mole % to 58 mole % of a siloxy silane of formula I,
(II) 21 mole % up to less than 42 mole % of an unsubstituted alkyl (meth)acrylate of formula II,
(III) 0 to 5 mole % of a Group A monomer, and
(IV) 0 to 29 mole % of an additional vinylic copolymerizable monomer of Group B; or
where (iii) is
(I) 16 mole % up to less than 42 mole % of a siloxy silane of formula I,
(II) 42 mole % to 58 mole % of an unsubstituted alkyl (meth)acrylate of formula II
(III) 0 to 5 mole % of a Group A monomer, and
(IV) 0 to 36 mole % of an additional vinylic copolymerizable monomer of Group B;
in which formula I is

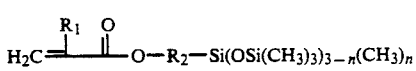
(I)

in which $R_1$ is hydrogen or methyl;
$R_2$ is alkyl of 1–6 carbon atoms; and
n is an integer of from 0 to 3;
and where formula II is

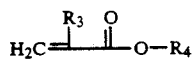
(II)

in which $R_3$ is hydrogen or methyl; and
$R_4$ is methyl or a linear or branched chain $C_{2-10}$-alkyl which is unsubstituted;
and where Group A monomers are selected from (meth)acrylic acid, maleic acid, fumaric acid, itaconic acid, itaconic acid, cinnamic acid, crotonic acid, fumaric acid, maleic acid, 2-(methy)acroyloxyethyl sulfonic acid, 2-(meth)acrylamido-2-methylpropane sulfonic acid, vinyl sulfonic acid, p-styrene sulfonic acid, allyl sulfonic acid, and monomers of formula II

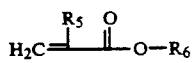
(III)

in which $R_5$ is hydrogen or methyl; and $R_6$ is a substituted linear or branched alkyl group of up to 10 carbon atoms, said substituent being selected from the group consisting of hydroxy, $C_{1-4}$ alkoxy, Cl, Br, F, carboxy, $C_{1-4}$alkoxycarbonyl, $C_{1-4}$alkylcarbonyloxy, and amino; and said additional vinylic copolymerizable monomer is neither a polymerization initiator, a crosslinker, nor a member of the group of compounds of formulae I, or II, nor a member of Group A as defined above, but is a mono-unsaturated monomer which is copolymerizable with compounds of formulae I, II, and members of Group A.

The foregoing monomers of formula I, formula II, the optional monomers of Group A and the optional additional vinylic copolymerizable monomers of Group B are all available commercially or readily synthesized by procedures and processes commonly available and known to those of ordinary skill in the art as are the initiators and crosslinkers, which may also be present, discussed below. Typical sources of these monomers include, but are not limited to: Huls America Inc. (Piscataway, N.J.), Shin-Etsu Chemical Co. (Tokyo, Japan), and Aldrich Chemical Company (Milwaukee, Wis.), to name a few.

The most preferred copolymers of the invention are those which are made up of solely monomers of formula I and formula II without any monomers of formula III or any optional additional vinylic copolymerizable monomer. Within this group, the single most preferred polymer has 3-methacryloxypropyl-tris(trimethysiloxy)-silane as the sole compound of formula I and 2-ethylhexyl acrylate as the sole compound of formula II.

Polymerization is carried out by mixing the desired ratios of the monomers with an appropriate polymerization initiator, whether UV or heat polymerization initiator, and where desirable an appropriate amount of a suitable crosslinker. The polymerization mixture, is then exposed to either UV irradiation or heat, respectively, to effect polymerization. However, where suitable, other curing methods can still be utilized.

Typical thermal initiators include, but are not limited to: 2,2'-azobis-(2-amidinopropane) hydrochloride; 4,4'-azobis-(4-cyanovaleric acid); 1,1'-azobis-(cyclohexanecarbonitrile); 2,2'-azobis-(2,4-dimethylvaleronitrile; 2,2'-azobis-(4-methoxy-2,4-dimethylvaleronitrile); 2,2'-azobisisobutyronitrile; 2,2'-azobis-(2-methylbutyronifile); benzoyl peroxide; lauryl peroxide; decanoly peroxide; acetyl peroxide; succinic acid peroxide; methylethyl-ketone peroxide; propionyl peroxide; pelargonyl peroxide; p-chloro-benzoyl perioxide; bis-(1-hydroxycyclohexyl)peroxide; dimethyl-2,2'-azobisisobutyrate; isopropyl percarbonate; tert.-butyl peroctoate; tert.-butyl peroxyacetate; tert.-butyl peroxypivalate; 2,5-dimethyl-2,5-bis-(2-ethylhexanoylperoxy)hexane; tert.-butyl-peroxy butyrate; tert.-butyl-peroxy maleic acid; tert.-butyl-peroxy isopropyl carbonate; 1,1'-bis(cyclohexane) carbonitrile and mixtures thereof Typical UV initiators include, without limitation: benzoin; alpha-methyl benzoin; benzoin methyl ether, benzoin ethyl ether; benzoin isopropyl ether; benzoin isobutyl ether, diketones, such as benzil and diacetal; acetophenone; alpha,alpha,alpha-tribromoacetophenone and the O-nitro derivative thereof, alpha,alpha-di(ethoxy)acetophenone; 1-hydroxycyclohexyl phenyl ketone; 2,2-dimethoxy-2-phenylacetophenone; 2-hydroxy-2-methyl-1-phenyl-1-propanone; benzophenone and its derivatives such as p,p'-tetramethylenediamine benzophenone; alpha-acryloximine esters such as benzil-(2-oxyethyl-oxycarbonyl)-alpha-monoxamine; benzil ketals such as benzil dimethyl ketal, benzil diethyl ketal, and 2,5-dichlorobenzil dimethyl ketal; phenothiazine; diisopropylxanthogen-disulfide; 2-methyl-l-[4-(methylthio)phenyl]-2-morpholinopropanone-1; 2,2-dimethoxy-2-phenylacetophenone; 2-benzyl-2-dimethylamino- 1-(4-morpholinophenyl)-butanone- 1; 2- hydroxy-2-methyl-1-phenylpropan-1-one; 2,4,6-trimethyl-benzoyldiphenylphosphine.

The typical range of molar ratio of monomers to initiator is 50:1 to 6000:1, preferably 50:1 to 1 000:1, more preferably 50:1 to 500:1.

Typical crosslinkers include, but are not limited to: di(meth)acrylate ethylene glycol having 1 to 100 ethylene oxide units, preferably 1 to 20 ethylene oxide units, more preferably 1 to 10 ethylene oxide units; lower alkylenediol di(meth)acrylate provided that there are no geminal oxygen atoms in the alkylenediol portion; ethylene glycol divinyl ether; glycerol tri(meth)acrylate; allyl(meth)acrylate; trimethylolpropane tri- or tetra- (meth)acrylate; pentaerythritol tri- or tetra- (meth)acrylate; divinyl benzene; divinyl ether, divinyl suldone; bisphenol A di((meth)acrylate); ethoxylated bis phenol A di((meth)acrylate); methylene bis (meth)acrylate; dimethylene bis (meth)acrylate; N,N'-dihydroxyethylene bis (meth)acrylamide; hexamethylene bis(meth)acrylamide; decamethylene bis (meth)acrylamide; allyl maleate; diallyl maleate; triallyl melamine; diauyl itaconate; diallyl phthalate; triallyl phosphite; polyallyl sucrose; sucrose di((meth) acrylate); glucose di((meth-)acrylate; etc.

The initiators and crosslinkers for use in the present invention are readily available commercially, for example from the aforementioned suppliers, or can be readily synthesized by generally known methods and/or techniques.

The initiator/monomer reaction mixture is typically exposed to the initiating conditions (heat or UV light) for a period of about 20 seconds to 30 minutes, preferably 40 seconds to 10 minutes, more preferably 1 minute to about 5 minutes, most preferably 1.5 minutes to about 2.5 minutes, after which, the initiating condition need not be maintained. For purposes of this disclosure the initiator and any crosslinker which may be present is neglected in calculating the mole %s in the monomer feed or final composition.

The copolymers of the invention can be recovered from the reaction vessels in manners typically known such as precipitation from methanol and other typical solvents, such as ethanol, and ethyl acetate. The polymers of the invention can then be utilized in any manner known for pressure sensitive adhesives. As stated earlier, the invention polymers are particularly advantageous for use in the medical adhesive area, especially as applied to transdermal drug delivery devices. Such devices have been widely described attempting to use other adhesives. Replacement of the adhesives in the devices described in the art with the instant invention copolymer adhesives results in achieving the objectives of the present invention.

EXAMPLES

The following Examples are presented to illustrate, but not limit the claimed invention.

EXAMPLES 1–13

3-methacryloxypropyl tris(trimethylsiloxy)silane (I) and 2-ethylhexyl acrylate (II) are fed into a reaction vessel in the molar amounts set out in Table I below. Benzoin methyl ether is added in the amount indicated and the entire reaction mixture is exposed to UV radiation of the indicated wavelength, intensity and duration as set forth in Table I. The resultant mass is then dissolved in tetrahydrofuran and the polymer is precipitated from methanol.

TABLE I

| EX. # | AMOUNT I[1] | AMOUNT II[1] | AMOUNT BME[2] | WAVE[3] LENGTH | POWER[4] | TIME[5] |
|---|---|---|---|---|---|---|
| 1 | 10 | 90 | 500 | 365 | 4 | 2 |
| 2 | 20 | 80 | 500 | 365 | 4 | 2 |
| 3 | 30 | 70 | 500 | 365 | 4 | 2 |
| 4 | 40 | 60 | 500 | 365 | 4 | 2 |
| 5 | 50 | 50 | 500 | 365 | 4 | 2 |
| 6 | 60 | 40 | 500 | 365 | 4 | 2 |
| 7 | 70 | 30 | 500 | 365 | 4 | 2 |
| 8 | 80 | 20 | 500 | 365 | 4 | 2 |
| 9 | 90 | 10 | 500 | 365 | 4 | 2 |
| 10 | 42 | 58 | 500 | 365 | 4 | 2 |
| 11 | 58 | 42 | 500 | 365 | 4 | 2 |
| 12 | 42 | 58 | 1000 | 365 | 4 | 2 |
| 13 | 42 | 58 | 1000 | 334 | 2 | 2 |

[1] Molar Fraction based on Sum of I and II.
[2] Molar ratio of (sum of I and II) to Benzoin Methyl Ether
[3] Wavelength in nm of light used in photoinitiation
[4] Power of emitted light in milliwatt per cm$^2$ at surface of monomer solution
[5] Length of time reaction mixture exposed to initiating light in min.

EXAMPLE 14–22

The products of Examples 1–9 were analyzed for final product monomer content and the resultant polymers were evaluated for cohesive and adhesive strength. The results appear in Table II below.

TABLE II

| EXAMPLE # | PRODUCT OF EXAMPLE # | FINAL POLYMER[a] COMPOSITION | 180° PEEL ADHESION[b] |
|---|---|---|---|
| 14 | 1 | 78.2:21.8 | 0.77[c] |
| 15 | 2 | 71.6:28.4 | 0.63[c] |
| 16 | 3 | 62.8:37.2 | 0.97[c] |
| 17 | 4 | 52.2:47.8 | 1.04[c] |
| 18 | 5 | 46.8:53.2 | 1.37 |
| 19 | 6 | 38.2:61.8 | 0.06[d] |
| 20 | 7 | 26.0:74.0 | 0.04[d] |
| 21 | 8 | 17.0:83.0 | —[e] |

TABLE II-continued

| EXAMPLE # | PRODUCT OF EXAMPLE # | FINAL POLYMER[a] COMPOSITION | 180° PEEL ADHESION[b] |
|---|---|---|---|
| 22 | 9 | 13.6:86.4 | —[e] |

[a] Final polymer molar ratios of I:II
[b] Peel Adhesion in Kg/cm
[c] Cohesive failure was observed
[d] Adhesives separated from backing material
[e] No tack.

EXAMPLES 23-28

The procedure of Example 1 is repeated except that either or both of the substituted alkyl (meth)acrylate of formula III (A) and the additional copolymerizable vinylic monomer (B) are also present. The particular components and amounts are set forth in Table II below.

TABLE III[a]

| EX. # | AMT I[1] | AMT II[1] | MONOMER A[b] | AMT A | MONOMER B[c] | AMT B |
|---|---|---|---|---|---|---|
| 23 | 50 | 21 | — | — | vi-acetate | 29 |
| 24 | 50 | 21 | HEMA | 4 | vi-acetate | 25 |
| 25 | 20 | 50 | — | — | allyl alcohol | 30 |
| 26 | 20 | 50 | HEMA | 5 | allyl alcohol | 25 |
| 27 | 42 | 42 | — | — | N-vi-pyrrolidone | 16 |
| 28 | 42 | 42 | HEMA | 4 | N-vi-pyrrolidone | 12 |

[a] All amounts are mole % based on the sum of I + II + A + B.
[b] HEMA = 2-HYDROXYETHYL METHACRYLATE
[c] vi = VINYL

We claim:

1. A polymer having a polymerization feed mixture of
   (a) an effective amount of a polymerization initiator,
   (b) 0 to 5 mole %, based on the total of all monomers present, of a vinylic copolymerizable crosslinker; and
   (c) one of the following groups (i), or (iii);
   where (i) is
   (I) 42 mole % to 58 mole % of a siloxy silane of formula I,
   (II) 42 mole % to 58 mole % of an unsubstituted alkyl (meth)acrylate of formula II,
   (III) 0 to 5 mole % of a Group A monomer, and
   (IV) 0 to 16 mole % of an additional vinylic copolymerizable monomer of Group B; or
   where (iii) is
   (I) 16 mole % up to less than 42 mole % of a siloxy silane of formula I,
   (II) 42 mole % to 58 mole % of an unsubstituted alkyl (meth)acrylate of formula II,
   (III) 0 to 5 mole % of a Group A monomer, and
   (IV) 0 to 36 mole % of an additional vinylic copolymerizable monomer of Group B; in which formula I is

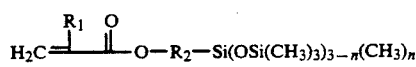  (I)

in which $R_1$ is hydrogen or methyl;
$R_2$ is alkylene of 1-6 carbon atoms; and
n is an integer of from 0 to 2;
and where formula II is

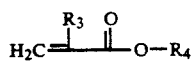  (II)

in which $R_3$ is hydrogen or methyl; and
$R_4$ is methyl or a linear or branched chain $C_{2-10}$alkyl which is unsubstituted;
and where Group A monomer is a monomer selected from (meth)acrylic acid, maleic acid, fomaric acid, itaconic acid, cinnamic acid, crotonic acid, 2-(methy)acroyloxyethyl sulfonic acid, 2-(meth)acrylamido-2-methylpropane sulfonic acid, vinyl sulfonic acid, p-styrene sulfonic acid, allyl sulfonic acid and monomers of formula III

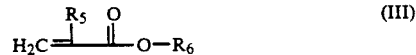  (III)

in which $R_5$ is hydrogen or methyl; and $R_6$ is a substituted linear or branched alkyl group of up to 10 carbon atoms, said substituent being selected from the group consisting of hydroxy, $C_{1-4}$alkoxy, Cl, Br, F, carboxy, $C_{1-4}$alkoxycarbonyl, $C_{1-4}$alkylcarbonyloxy, and amino;
and said additional vinylic copolymerizable monomer of Group B is neither a polymerization initiator, a crosslinker, nor a member of the group of compounds of formulae I, or II, nor a member of Group A monomers as defined above, but is a monounsaturated monomer which is copolymerizable with compounds of formulae I, II, and Group A monomers.

2. The polymer of claim 1 having the feed monomer composition of group (i).

3. The polymer of claim having the feed monomer composition of group (iii).

4. The polymer of claim 1 wherein the siloxy silane of formula I comprises about 45-55 mole % of the monomer feed composition.

5. The polymer of claim 1 wherein the alkyl(meth)acrylate of formula II comprises 45-55 mole % of the monomer feed composition.

6. The polymer of claim 1 wherein the siloxy silane of formula I comprises about 50 mole % of the monomer feed composition.

7. The polymer of claim 1 wherein the alkyl(meth)acrylate of formula II comprises about 50 mole % of the monomer feed composition.

8. The polymer of claim 1 wherein said feed monomer composition consists essentially of:

(a) 42 mole % to 58 mole % of the siloxy silane of formula I; and (b) 42 mole % to 58 mole % of the alkyl (meth)acrylate of formula II.

9. A polymer having a polymerization feed mixture of
(a) an effective amount of a polymerization initiator,
(b) 0 to 5 mole %, based on the total of all monomers present, of a vinylic copolymerizable crosslinker;
(c) 42 mole % to 58 mole % of a siloxy silane of formula I;
(d) 21 mole % up to less than 42 mole % of an unsubstituted alkyl (meth)acrylate of formula II;
(e) 0 to 5 mole % of a Group A monomer and
(f) 0 to 29 mole % of an additional vinylic copolymerizable monomer of a Group B;

in which formula I is

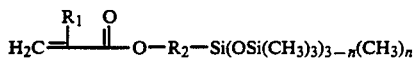
(I)

in which $R_1$ is hydrogen or methyl;
$R_2$ is alkylene of 1–6 carbon atoms; and
n is an integer of from 0 to 2;
and where formula II is

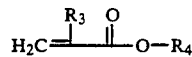
(II)

in which $R_3$ is hydrogen or methyl; and
$R_4$ is methyl or a linear or branched chain $C_{2-10}$ alkyl which is unsubstituted;
and where Group A monomer is a monomer selected from (meth)acrylic acid, maleic acid, fumaric acid, itaconic acid, cinnamic acid, crotonic acid, 2-(methy)acroyloxyethyl sulfonic acid, 2-(meth)acrylamido-2-methylpropane sulfonic acid, vinyl sulfonic acid, p-styrene sulfonic acid, allyl sulfonic acid and monomers of formula III

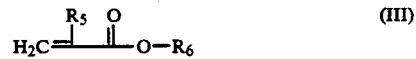
(III)

in which $R_5$ is hydrogen or methyl; and $R_6$ is substituted linear or branched alkyl group of up to 10 carbon atoms, said substituent being selected from the group consisting of hydroxy, $C_{1-4}$ alkoxy, Cl, Br, F, carboxy, $C_{1-4}$ alkoxycarbonyl, $C_{1-4}$ alkylcarbonyloxy, and amino;
and said additional vinylic copolymerizable monomer of Group B is neither a polymerization initiator, a crosslinker, nor a member of the group of compounds of formulae I, or II, nor a member of Group A monomers as defined above, but is a monounsaturated monomer which is copolymerizable with compounds of formulae I, II, and Group A monomers.

* * * * *

UNITED STATES PATENT AND TRADEMARK OFFICE
CERTIFICATE OF CORRECTION

PATENT NO. : 5,288,827
DATED : February 22, 1994
INVENTOR(S) : Li et al.

It is certified that error appears in the above-identified patent and that said Letters Patent is hereby corrected as shown below:

Column 14, line 14, after "maleic acid" please delete "fomaric" and insert --fumaric-- in lieu thereof.

Column 14, line 53, after "claim" please insert --1--.

Signed and Sealed this

Nineteenth Day of July, 1994

Attest:

BRUCE LEHMAN

Attesting Officer     Commissioner of Patents and Trademarks